Figure 1:
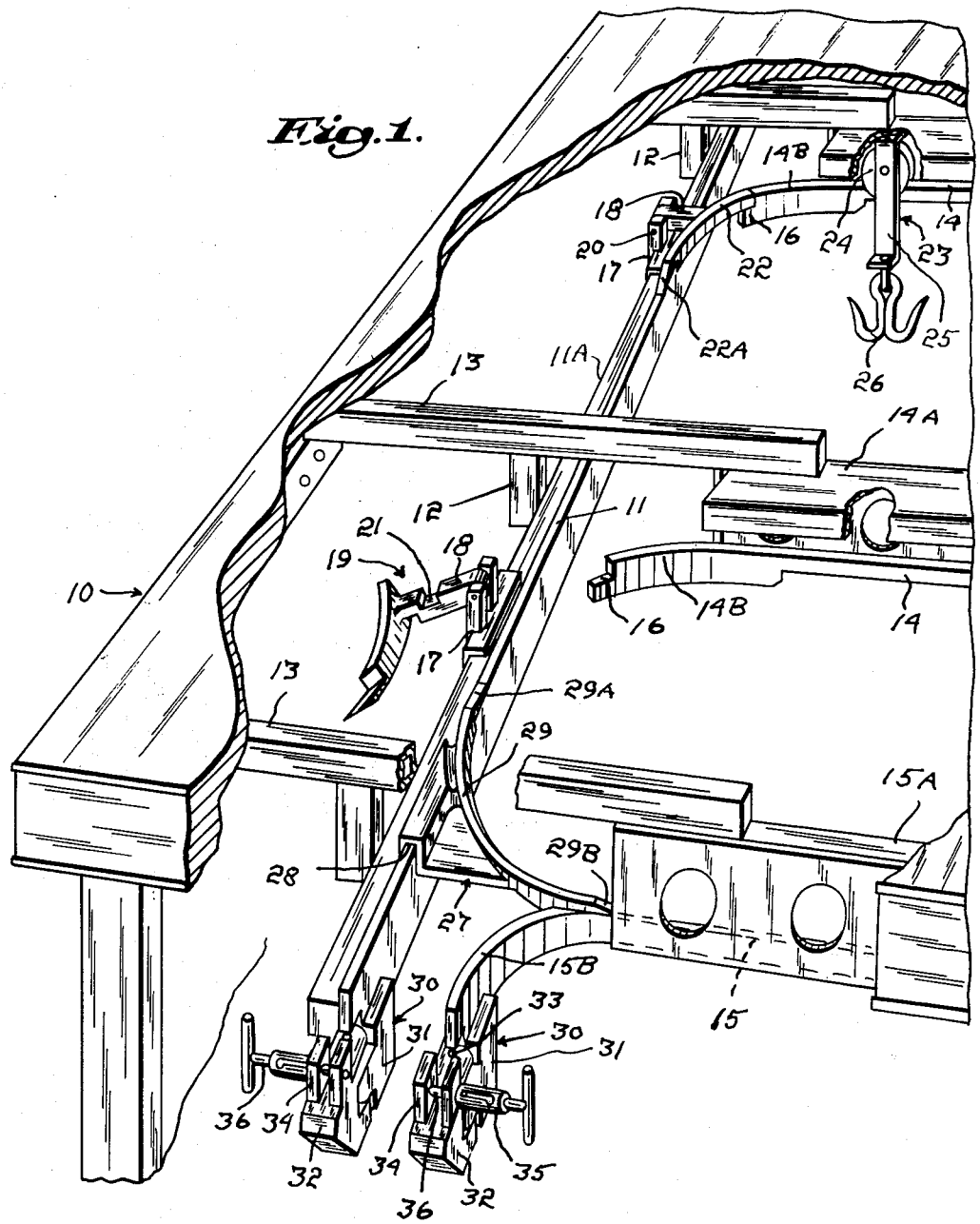

Oct. 19, 1965   J. W. O'DONNELL   3,212,452
OVERHEAD RAIL SYSTEMS

Filed Sept. 26, 1963   2 Sheets-Sheet 1

Inventor:
James W. O'Donnell,
by
Attorney

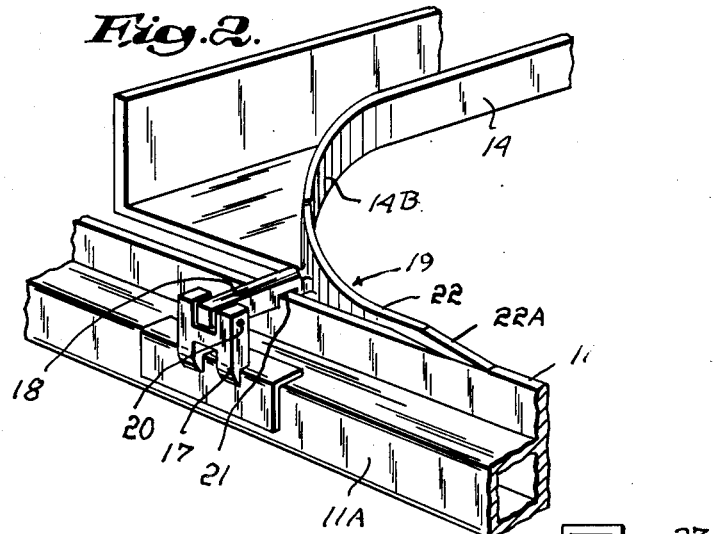
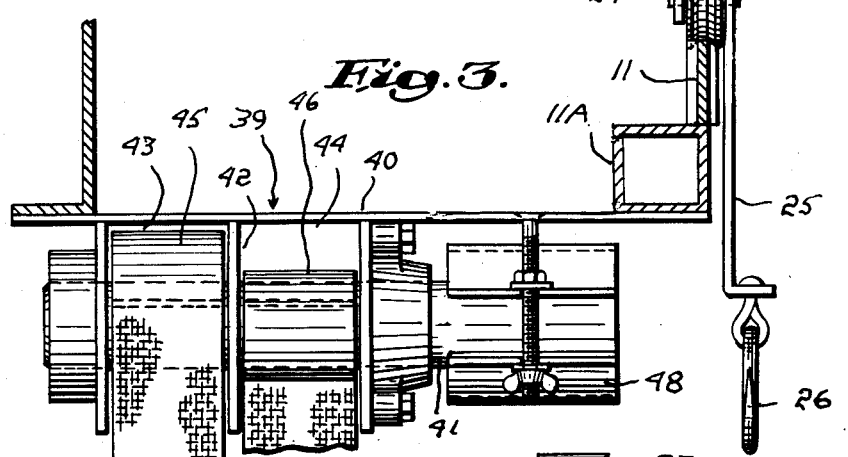
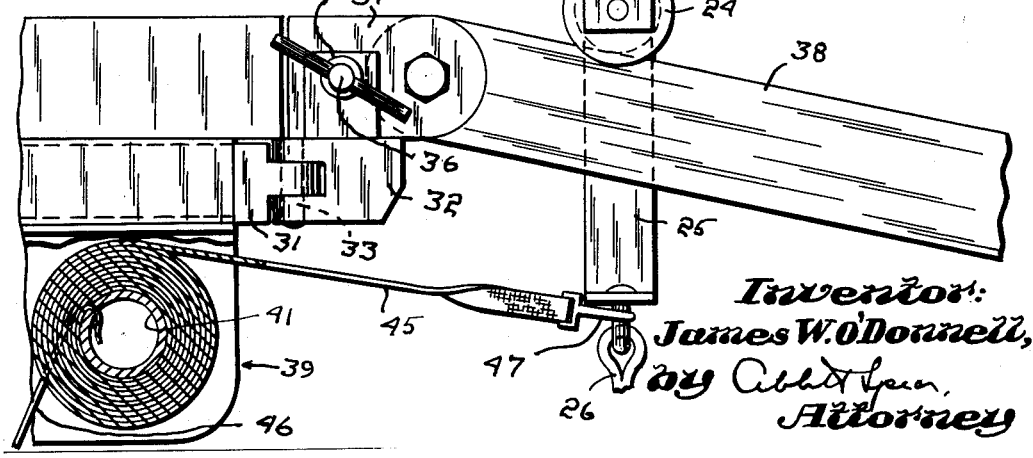
Inventor:
James W. O'Donnell,
by Abel & Ljung,
Attorney

United States Patent Office 3,212,452
Patented Oct. 19, 1965

3,212,452
OVERHEAD RAIL SYSTEMS
James W. O'Donnell, Main St., Plympton, Mass.
Filed Sept. 26, 1963, Ser. No. 311,730
4 Claims. (Cl. 104—91)

The present invention relates to overhead rail systems for use in loading and unloading vehicles when stationed at warehouse and store platforms.

Meat is commonly transported from the warehouse to the stores in truck or trailer bodies provided with overhead rail systems for carriers having hooks on which the meat is hung. Such systems include storage rails, a loading and unloading rail, and switch means for connecting the former to the latter as required.

Because of the height of the rail system, the switch means are a problem because they must be capable of being quickly and positively set in one or the other of their positions and the provision of such switches is the particular objective of the invention.

In accordance with the invention, an overhead rail system has a series of transverse, storage rails and a longitudinal loading and unloading or main rail spaced from corresponding ends of the storage rails. The rail system includes a series of switches, one for each transverse rail and including a hinge connecting it to the longitudinal rail and enabling it to be swung from an open position, at the hinge side, across the longitudinal rail into a closed position connecting that storage rail to the longitudinal rail and having an end portion in the form of a ramp resting thereon. As either switch position is easily and positively established and as the switch positions are evident from a glance, they are well adapted to meet the various conditions encountered in use.

An objective of the invention is that of providing means operable to brake the travel of meat carrying carriers along the unloading rail including detachable and downwardly inclined extensions thereof.

In the accompanying drawings, there is shown an illustrative embodiment of the invention in which FIGURE 1 is a fragmentary, perspective view of a rail system installed in a truck or trailer body, FIGURE 2 is a fragmentary, perspective view, on an increased scale, of a switch positioned to connect a storage rail to the longitudinal rail, FIGURE 3 is a cross section of the longitudinal rail showing, in elevation, braking means for the carrier, and FIGURE 4 is a cross section through the braking means showing a carrier on the rail section used in connecting the rail system of the body to that at the store or warehouse.

In the embodiment of the invention illustrated by the drawings, the body of a truck or trailer is generally indicated at 10 and is shown as having a longitudinal loading and unloading or main rail 11 to the box type base 11A of which are connected members 12 depending from the transverse supports 13. The transverse supports 13 are also connected to the overhang 14A of each transverse, storage rail 14 and to the overhang 15A of the transverse reversing rail 15 which is parallel to the storage rails 14 but includes a curved end 15B terminating beside the loading and unloading end of the rail 11.

The storage rails 14 are in a plane slightly above that inclusive of the longitudinal rail 11 and the reversing rail 15 and their ends 14B are shown as curved and spaced from the longitudinal rail 11 with the free end of each provided with a shoulder 16.

The rail base 11A is provided with mounts 17, one adjacent each transverse rail 14. The arm 18 of a generally indicated switch 19 is connected to each mount 17 by a pivot 20 to swing from an inoperative position, on the side of the rail 11 opposite the storage rails 14, across the rail 11 and into an operative position in which it closes the gap between the main rail 11 and the adjacent storage rail. The arm 18 has a notch 21 which receives the rail 11 in the operative position of the switch 19 of which it is a part. The switch 19 has a curved rail portion 22 with one end resting, in its operative, gap closing position, on a shoulder 16 of a rail end 14B and the other end 22A being in the form of a ramp resting on the rail 11.

A conventional carrier for meat is generally indicated at 23. Each such carrier has a track engaging wheel 24 rotatably supported at the upper end of a depending arm 25 to the lower end of which hooks 26 are attached. The carrier 23 is shown on a storage rail 14 and as the switch 19 for that rail is in its operative position, the carrier may be moved onto the rail 11. It will be noted that the carrier arm 25 is at one side of the wheel 24 and that the several rails are at one edge of their respective supporting structures. It will be appreciated that the overhangs 14A are spaced sufficiently close to the rails 14 to function as a housing to prevent the carrier wheels 24 from jumping off the track during transit.

When the rail system of the warehouse or store will not receive the carriers 23 because their depending arms 25 are on the wrong side with respect to said supporting structure, the carriers must be reversed and the reversing rail 15 is for use in that even when the reversing rail 15 is connected to the rail 11 as by means of the generally indicated switch 27. The switch 27 has a longitudinal, downwardly opening channel 28 receiving the rail 11 and supporting the curved rail 29 which has ramp ends 29A and 29B resting on the rails 11 and 15, respectively.

The loading and unloading ends of the rails 11 and 15 are each provided with a generally indicated mount 30 including a section 31 secured to an appropriate one of the rails 11, 15 and a section 32 connected to the section 31 by the vertical pivot 33 enabling the section 32 to be swung from side-to-side. The section 32 has a yoke 34 one wall of which has a sleeve 35 slidably supporting a locking pin 36 for transverse movement between locking and unlocking positions.

Each yoke 34 is adapted to receive the link 37 pivoted to the rail section 38 by which the detachable unloading rail system of the body 10 is connected to that at the warehouse or store. When a link 37 is entered into one of the yokes 34, the locking pin 36 of that yoke is then moved into its locking position and the rail system is then ready for the loading and unloading of the body 10.

Unloading presents a particular problem. Due to the incline of the rail section 38 and to the weight of the loaded carriers 23, it is desirable to provide means enabling the carriers to be "braked" as they travel downwardly along the rail section 38. For that reason, the generally indicated braking control unit 39, see FIGURES 3 and 4, may be secured to the body 10 and to the rail base 11A adjacent the loading and unloading ends of the rails 11 and 15 by means of a downwardly opening U-shaped bracket 40 for a rotatable support such as the shaft 41 and divided by a partition 42 to provide chambers 43 and 44 for flexible members such as the straps 45 and 46, respectively. The straps 45 and 46 are both connected to the shaft 41 but are wound thereon in opposite directions so that when the strap 45 is connected to a carrier 23 as by means of its hook 47, and is pulled, in an unwinding direction, by the carrier as it moves downwardly along the rail section 38, the strap 46 is wound in. The free end of the strap 46 is manually held so that the rate of the carrier 23 may be controlled with ease and convenience. In practice, one end of the shaft 41 is held by an adjustable clamp 48 secured to the bracket 40 and functions as a brake to facilitate such control.

I claim:

1. In an overhead rail system for wheeled carriers of the type having a depending, load carrying arm, a main rail, a series of storage rails extending laterally with respect to one of the sides of said main rail and spaced therefrom to provide a series of gaps for the passage of a carrier along said main rail, and a series of switches, one for each gap, each switch including a gap-closing rail portion, a supporting arm for said rail portion, and a hinge connecting said arm to the other side of said main rail and enabling said switch to be swung from an open position at the hinge side of the main rail downwardly across said main rail and into engagement therewith into a position in which its rail portion closes the appropriate one of said gaps to receive a carrier as it travels between said main rail and the storage rail then connected thereto, each switch arm including a notch receiving, in its gap-closing position, the upper portion of said main rail.

2. In an overhead rail system for wheeled carriers of the type having a depending, load carrying arm, a main rail, said main rail including a base of a box type, said main rail being located at one edge thereof, a series of storage rails extending laterally with respect to one of the sides of said main rail and spaced therefrom to provide a series of gaps for the passage of a carrier along said main rail, and a series of switches, one for each gap, each switch including a gap-closing rail portion, a supporting arm for said rail portion, and a hinge connecting said arm to the other side of said main rail base and enabling said switch to be swung from an open position at the hinge side of the main rail downwardly across said main rail and into engagement therewith into a position in which its rail portion closes the appropriate one of said gaps to receive a carrier as it travels between said main rail and the storage rail then connected thereto, each switch arm including a notch receiving, in its gap-closing position, the upper portion of said main rail.

3. In an overhead rail system for wheeled carriers of the type having a depending, load carrying arm, a main rail, a series of storage rails extending laterally with respect to one of the sides of said main rail and spaced therefrom to provide a series of gaps for the passage of a carrier along said main rail, and a series of switches, one for each gap, each switch being movable from an open position enabling travel along said main rail into a position in which it closes the appropriate one of said gaps to receive a carrier as it travels between said main rail and the storage rail then connected thereto, each storage rail including a carrier receiving housing, the upper part of said housing being in the form of an inverted channel confining each carrier against derailment, said housing having a lengthwise open ended, downwardly opening slot to accommodate the carrier arms.

4. In an overhead rail system for wheeled carriers of the type having a depending, load carrying arm, a main rail, a series of storage rails extending laterally with respect to one of the sides of said main rail and spaced therefrom to provide a series of gaps for the passage of a carrier along said main rail, a series of switches for selectively closing said gaps, an unloading rail detachably connected to said main rail and disposable in a downwardly inclined unloading position, and a braking control adjacent the end of the main rail to which the unloading rail is attached, said braking control including a rotatable support, and a pair of oppositely wound flexible members on said support, one of said members being attachable to a carrier when adjacent the junction of said main and unloading rails, the other of said members being at least partially unwound and being wound as said one member is unwound as by the pull of the attached carrier when on said unloading rail, said other member being engageable by an operator to be held by him to control the winding thereof thus to provide braking control of said carrier.

References Cited by the Examiner

UNITED STATES PATENTS

| | | | |
|---|---|---|---|
| 451,602 | 5/91 | Richardson | 104—96 |
| 884,383 | 4/08 | Hauptman | 104—101 |
| 1,531,075 | 3/25 | Glubine | 104—5 |
| 1,550,140 | 8/25 | Bennington | 104—94 |
| 2,138,962 | 12/38 | Forker | 104—102 |
| 2,610,584 | 9/52 | Withers et al. | 104—101 |
| 2,868,138 | 1/59 | Bishop et al. | 104—88 |
| 3,072,072 | 1/63 | McDonough | 104—110 |
| 3,084,635 | 4/63 | Withers et al. | 104—101 |
| 3,084,725 | 4/63 | Siverson | 104—196 X |

FOREIGN PATENTS 153,272    4/38    Austria.

MILTON BUCHLER, *Primary Examiner.*
LEO QUACKENBUSH, *Examiner.*